United States Patent
Prokhorov

(10) Patent No.: US 9,764,736 B2
(45) Date of Patent: Sep. 19, 2017

(54) AUTONOMOUS VEHICLE OPERATION RELATIVE TO UNEXPECTED DYNAMIC OBJECTS

(71) Applicant: Toyota Motor Engineering & Manufacturing North America, Inc., Erlanger, KY (US)

(72) Inventor: Danil V. Prokhorov, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 6 days.

(21) Appl. No.: 14/826,715

(22) Filed: Aug. 14, 2015

(65) Prior Publication Data

US 2017/0043768 A1     Feb. 16, 2017

(51) Int. Cl.
| | | |
|---|---|---|
| *G05D 1/00* | (2006.01) | |
| *B60W 30/09* | (2012.01) | |
| *B60W 30/095* | (2012.01) | |
| *B60W 30/085* | (2012.01) | |
| *B60W 10/20* | (2006.01) | |

(Continued)

(52) U.S. Cl.
CPC ............ *B60W 30/09* (2013.01); *B60W 10/04* (2013.01); *B60W 10/18* (2013.01); *B60W 10/20* (2013.01); *B60W 30/085* (2013.01); *B60W 30/095* (2013.01); *G05D 1/0088* (2013.01); *G05D 1/021* (2013.01); *B60W 2550/10* (2013.01); *B60W 2550/30* (2013.01); *B60W 2710/18* (2013.01);

(Continued)

(58) Field of Classification Search
CPC combination set(s) only.
See application file for complete search history.

(56) References Cited

U.S. PATENT DOCUMENTS

| | | | | |
|---|---|---|---|---|
| 5,983,161 A | * | 11/1999 | Lemelson | G01S 19/11 |
| | | | | 340/436 |
| 6,678,590 B1 | * | 1/2004 | Burchfiel | G05D 1/0214 |
| | | | | 348/116 |

(Continued)

OTHER PUBLICATIONS

Gavrila et al., "Multi-cue Pedestrian Detection and Tracking from a Moving Vehicle", International Journal of Computer Vision, 2007, vol. 73, No. 1, pp. 41-59, United States (19 pages).

(Continued)

*Primary Examiner* — Jonathan L Sample
(74) *Attorney, Agent, or Firm* — Christopher G. Darrow; Darrow Mustafa PC

(57) ABSTRACT

An autonomous vehicle may operate in an environment in which there is an unexpected dynamic object. The autonomous vehicle can detect the dynamic object. The dynamic object can have an associated movement. The movement of the dynamic object can be tracked. The movement of the dynamic object can be classified as being one ballistic or non-ballistic. It can be determined whether the dynamic object is on a collision course with the autonomous vehicle. Responsive to determining that the dynamic object is on a collision course with the autonomous vehicle, a driving maneuver for the autonomous vehicle can be determined. The driving maneuver can be based at least in part on the movement of the dynamic object. The autonomous vehicle can be caused to implement the determined driving maneuver.

20 Claims, 3 Drawing Sheets

(51) Int. Cl.
  *B60W 10/18*   (2012.01)
  *B60W 10/04*   (2006.01)
  *G05D 1/02*    (2006.01)

(52) U.S. Cl.
  CPC ..... *B60W 2710/20* (2013.01); *B60W 2720/10* (2013.01)

(56) References Cited

U.S. PATENT DOCUMENTS

| | | | | |
|---|---|---|---|---|
| 7,660,436 | B2* | 2/2010 | Chang | G06K 9/00805 382/104 |
| 7,667,581 | B2* | 2/2010 | Fujimoto | G06K 9/00805 340/425.5 |
| 8,108,147 | B1* | 1/2012 | Blackburn | G08G 1/166 235/454 |
| 8,112,225 | B2* | 2/2012 | Eidehall | G01S 7/295 340/436 |
| 8,340,883 | B2* | 12/2012 | Arbitmann | B60W 10/06 235/439 |
| 8,504,283 | B2* | 8/2013 | Aso | G01S 13/726 280/735 |
| 8,576,055 | B2* | 11/2013 | Hara | G08G 1/166 340/435 |
| 8,589,061 | B2* | 11/2013 | Bengtsson | G08G 1/16 180/275 |
| 8,874,300 | B2* | 10/2014 | Allard | B60T 7/22 700/245 |
| 8,948,955 | B2* | 2/2015 | Zhu | G05D 1/0055 701/23 |
| 2002/0198632 | A1* | 12/2002 | Breed | B60N 2/2863 701/1 |
| 2003/0014165 | A1* | 1/2003 | Baker | G05D 1/107 701/3 |
| 2005/0060069 | A1* | 3/2005 | Breed | B60N 2/2863 701/408 |
| 2007/0078600 | A1* | 4/2007 | Fregene | G01S 13/9303 701/301 |
| 2009/0074249 | A1* | 3/2009 | Moed | G06K 9/00818 382/104 |
| 2009/0076702 | A1* | 3/2009 | Arbitmann | B60W 10/06 701/96 |
| 2009/0184862 | A1* | 7/2009 | Stayton | G08G 5/0008 342/30 |
| 2009/0326796 | A1* | 12/2009 | Prokhorov | G08G 1/161 701/532 |
| 2010/0179760 | A1* | 7/2010 | Petrini | G05D 1/101 701/301 |
| 2010/0305857 | A1* | 12/2010 | Byrne | G06T 7/73 701/301 |
| 2011/0210872 | A1* | 9/2011 | Molander | G01S 11/12 340/961 |
| 2012/0092208 | A1* | 4/2012 | LeMire | G01S 13/87 342/29 |
| 2012/0143488 | A1* | 6/2012 | Othmezouri | B60T 7/22 701/301 |
| 2014/0032049 | A1* | 1/2014 | Moshchuk | B62D 15/0265 701/42 |
| 2014/0139366 | A1* | 5/2014 | Moses | G01S 13/9303 342/27 |
| 2015/0160338 | A1* | 6/2015 | Bageshwar | G01S 13/9303 342/29 |
| 2015/0166062 | A1* | 6/2015 | Johnson | B60W 30/12 701/41 |
| 2016/0125746 | A1* | 5/2016 | Kunzi | G05D 1/0088 701/11 |

OTHER PUBLICATIONS

Fu et al., "Computer Vision Based Object Detection and Recognition for Vehicle Driving", IEEE, International Conference on Robotics & Automation, May 21-26, 2001, pp. 2634-2641, Seoul, Korea (8 pages).
Broadhurst et al., "Monte Carlo Road Safety Reasoning.", The Robotics Institute, Carnegie Mellon University, Undated (6 pages).
U.S. Appl. No. 14/280,634, filed May 18, 2014.
Danielsson et al., "Monte Carlo based Threat Assessment: Analysis and Improvements", IEEE Intelligent Vehicles Symposium, Istanbul, Turkey, Jun. 13-15, 2007 (6 pages).

* cited by examiner

AUTONOMOUS VEHICLE OPERATION RELATIVE TO UNEXPECTED DYNAMIC OBJECTS

FIELD

The subject matter described herein relates in general to vehicles having an autonomous operational mode and, more particularly, to the operation of such vehicles when unexpected dynamic objects are encountered.

BACKGROUND

Some vehicles include an operational mode in which a computing system is used to navigate and/or maneuver the vehicle along a travel route with minimal or no input from a human driver. Such vehicles include sensors that are configured to detect information about the surrounding environment, including the presence of objects in the environment. The computing systems are configured to process the detected information to determine how to navigate and/or maneuver the vehicle through the surrounding environment. In some instances, the vehicle may encounter objects that are not expected in the surrounding environment.

SUMMARY

In one respect, the present disclosure is directed to a method of operating an autonomous vehicle relative to unexpected dynamic objects in an external environment. The method can include detecting a dynamic object in the external environment of the autonomous vehicle. The dynamic object can have an associated movement. The method can include tracking the movement of the dynamic object. The method can also include classifying the movement of the dynamic object as one of ballistic or non-ballistic. The method can further include determining whether the dynamic object is on a collision course with the autonomous vehicle. Responsive to determining that the dynamic object is on a collision course with the autonomous vehicle, the method can include determining a driving maneuver for the autonomous vehicle based at least in part on the classification of the movement of the dynamic object. The method can include causing the autonomous vehicle to implement the determined driving maneuver.

In another respect, the present disclosure is directed to a system for operating an autonomous vehicle relative to unexpected dynamic objects in an external environment. The system can include a sensor system configured to detect a dynamic object in the external environment of the autonomous vehicle. The dynamic object can have an associated movement. The system can include a processor operatively connected to the sensor system. The processor can be programmed to initiate executable operations. The executable operations can include tracking the movement of the dynamic object. The executable operations can include classifying the movement of the dynamic object as one of ballistic or non-ballistic. The executable operations can include determining whether the dynamic object is on a collision course with the autonomous vehicle. The executable operations can also include, responsive to determining that the dynamic object is on a collision course with the autonomous vehicle, determining a driving maneuver for the autonomous vehicle based at least in part on the classification of the movement of the dynamic object. The executable operations can further include causing the autonomous vehicle to implement the determined driving maneuver.

In yet another respect, the present disclosure is directed to a computer program product for operating an autonomous vehicle relative to unexpected dynamic objects in an external environment. The computer program product includes a computer readable storage medium having program code embodied therein. The program code is executable by a processor to perform a method. The method can include detecting a dynamic object in the external environment of the autonomous vehicle. The dynamic object can have an associated movement. The method can include tracking the movement of the dynamic object. The method can also include classifying the movement of the dynamic object as one of ballistic or non-ballistic. The method can further include determining whether the dynamic object is on a collision course with the autonomous vehicle. Responsive to determining that the dynamic object is on a collision course with the autonomous vehicle, the method can include determining a driving maneuver for the autonomous vehicle based at least in part on the classification of the movement of the dynamic object. The method can include causing the autonomous vehicle to implement the determined driving maneuver.

DETAILED DESCRIPTION

Figure 1:
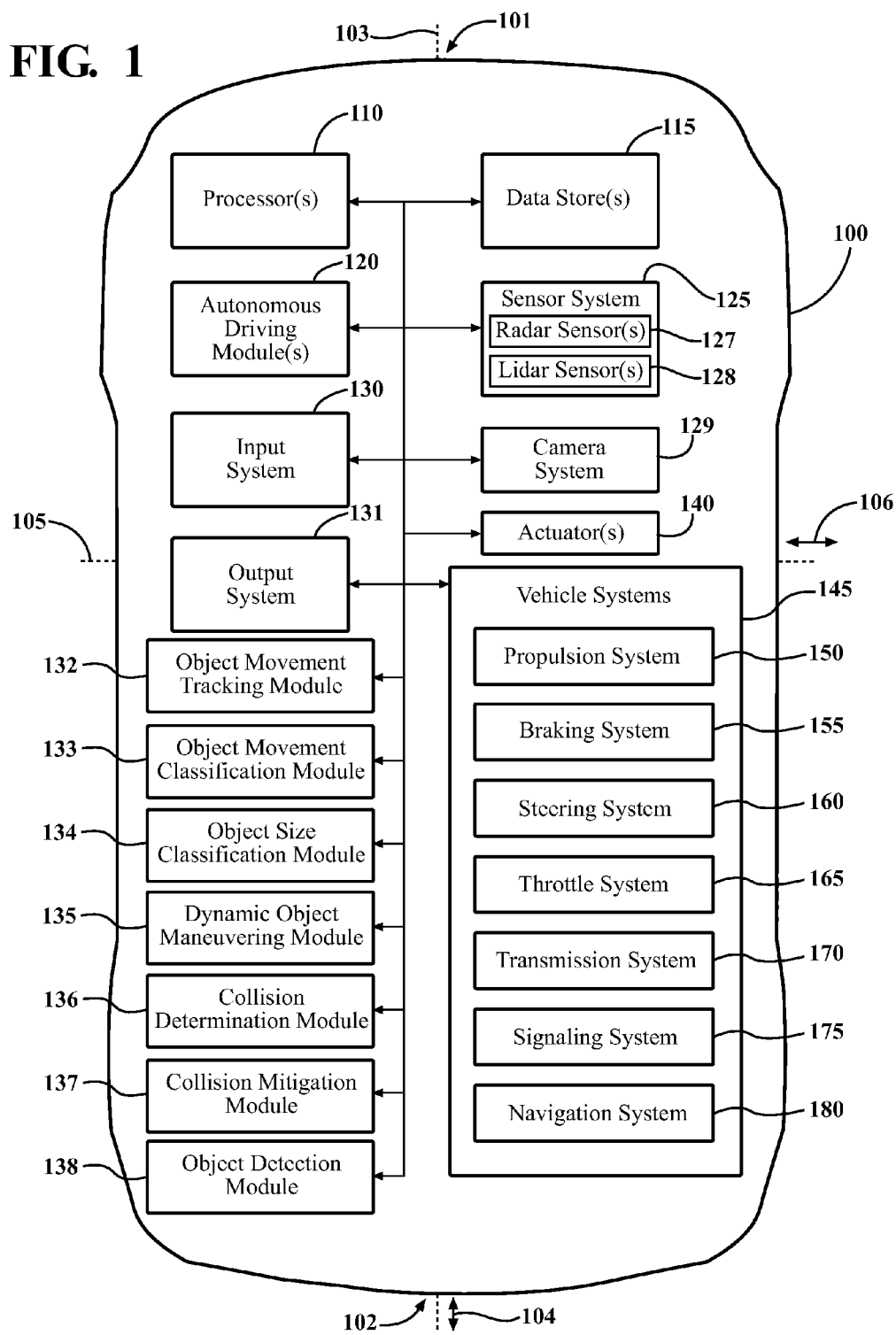
FIG. 1 is an example of an autonomous vehicle.

This detailed description relates to the operation of an autonomous vehicle in environments in which there is an unexpected dynamic object. The movement of the dynamic object can be tracked. The movement of the dynamic object can be classified as being one ballistic or non-ballistic. It can be determined whether the dynamic object is on a collision course with the autonomous vehicle. Responsive to determining that the dynamic object is on a collision course with the autonomous vehicle, a driving maneuver for the autonomous vehicle can be determined. The driving maneuver can be based at least in part on a classification (e.g., ballistic or non-ballistic) of the movement of the dynamic object. The present detailed description relates to systems, methods and computer program products that incorporate such features. In at least some instances, such systems, methods and computer program products can improve the situational competency of an autonomous vehicle and/or the safe operation of an autonomous vehicle.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-3B, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In one or more implementations, the vehicle 100 may be a watercraft, an aircraft or any other form of motorized transport. The vehicle 100 can have a front end 101 and a back end 102.

The vehicle 100 can have an associated longitudinal axis 103, which can be the central axis of the vehicle 100. The vehicle 100 can have an associated longitudinal direction 104. "Longitudinal direction" means any direction that is substantially parallel to and/or co-linear with the longitudinal axis 103. The vehicle 100 can have an associated lateral axis 105, which can be substantially perpendicular to the longitudinal axis 103. As used herein, the term "substantially" includes exactly the term it modifies and slight variations therefrom. Thus, the term "substantially perpendicular" means exactly perpendicular and slight variations therefrom. In this particular example, slight variations therefrom can include within normal manufacturing tolerances, within about 10 degrees or less, within about 5 degrees or less, within about 4 degrees or less, within about 3 degrees or less, within about 2 degrees or less, or within about 1 degree or less. The vehicle 100 can have an associated lateral direction 106. "Lateral direction" means any direction that is substantially parallel to and/or co-linear with the lateral axis 105.

According to arrangements herein, the vehicle 100 can be an autonomous vehicle. As used herein, "autonomous vehicle" means a vehicle that configured to operate in an autonomous mode. "Autonomous mode" means that one or more computing systems are used to navigate and/or maneuver the vehicle along a travel route with minimal or no input from a human driver. In one or more arrangements, the vehicle 100 can be highly automated. In some instances, the vehicle 100 can be configured to be selectively switched between an autonomous mode and a manual mode. Such switching can be implemented in any suitable manner, now known or later developed. "Manual mode" means that a majority of the navigation and/or maneuvering of the vehicle along a travel route is performed by a human driver.

The vehicle 100 can include various elements, some of which may be a part of an autonomous driving system. Some of the possible elements of the vehicle 100 are shown in FIG. 1 and will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, vehicle 100 may not include one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

The vehicle 100 can include one or more processors 110. "Processor" means any component or group of components that are configured to execute any of the processes described herein or any form of instructions to carry out such processes or cause such processes to be performed. The processor 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, the processor 110 can be a main processor of the vehicle 100. For instance, the processor 110 can be an engine control unit (ECU).

The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor 110, or the data store 115 can be operatively connected to the processor 110 for use thereby. The term "operatively connected," as used throughout this description, can include direct or indirect connections, including connections without direct physical contact.

The vehicle 100 can include an autonomous driving module(s) 120. The autonomous driving module 120 can be implemented as computer readable program code that, when executed by a processor, implement one or more of the various processes described herein, including, for example, determining a current driving maneuvers for the vehicle 100, future driving maneuvers and/or modifications. The autonomous driving module 120 can also cause, directly or indirectly, such driving maneuvers or modifications thereto to be implemented. The autonomous driving module 120 can be a component of the processor 110, or the autonomous driving module 120 can be executed on and/or distributed among other processing systems to which the processor 110 is operatively connected.

The autonomous driving module 120 can include instructions (e.g., program logic) executable by the processor 110. Such instructions can include instructions to execute various vehicle functions and/or to transmit data to, receive data from, interact with, and/or control the vehicle 100 or one or more systems thereof (e.g. one or more of vehicle systems 145). Alternatively or in addition, the data store 115 may contain such instructions.

As noted above, the vehicle 100 can include a sensor system 125. The sensor system 125 can include one or more sensors. "Sensor" means any device, component and/or system that can detect, determine, assess, monitor, measure, quantify and/or sense something. The one or more sensors can be configured to detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 125 includes a plurality of sensors, the sensors can work independently from each other. Alternatively, two or more of the sensors can work in combination with each other. The sensor system 125 and/or the one or more sensors can be operatively connected to the processor 110, the data store 115, the autonomous driving module 120 and/or other element of the vehicle 100.

The sensor system 125 can include any suitable type of sensor. For example, the sensor system 125 can include one or more sensors configured to detect, determine, assess, monitor, measure, quantify and/or sense information about the vehicle 100. Alternatively or in addition, the sensor system 125 can include one or more sensors configured to detect, determine, assess, monitor, measure, quantify and/or sense information about the external environment in which the vehicle 100 is located, including information about objects in the external environment. Such objects include stationary objects and/or dynamic objects. "Dynamic object" means an object that is moving in one or more directions. A dynamic object can include moving objects whose motion include temporary pauses. Alternatively or in addition to one or more of the above examples, the sensor system 125 can include one or more sensors configured to detect, determine, assess, monitor, measure, quantify and/or sense the location of the vehicle 100 and/or the location of objects in the environment relative to the vehicle 100. Various examples of these and other types of sensors will be described herein. It will be understood that the embodiments are not limited to the particular sensors described.

The sensor system 125 can include one or more sensors configured to detect, determine, assess, monitor, measure, quantify and/or sense position and orientation changes of the vehicle 100, such as, for example, based on inertial acceleration. In one or more arrangements, the sensor system 125 can include accelerometers, gyroscopes and/or other suitable sensors. The sensor system 125 can include sensors that can monitor one or more internal systems of the vehicle 100 (e.g., an $O_2$ monitor, a fuel gauge, an engine oil temperature, coolant temperature, etc.). The sensor system 125 can include one or more sensors (e.g., speedometers) to detect the speed of the vehicle 100.

The sensor system can include one or more sensors to detect the presence and/or location of passengers within the vehicle 100. Such detection can be performed in any suitable manner. For instance, the sensor system 125 can include one or more pressure sensors or weight sensors associated with the vehicle seats. When a passenger sits in one of the seats of the vehicle 100, the weight of the person on the seat can be detected.

The sensor system 125 can include one or more environment sensors. The environment sensors can be configured to detect, determine, assess, monitor, measure, quantify and/or sense objects in at least a portion of the external environment of the vehicle 100 and/or information/data about such objects. The one or more environment sensors can be provided in any suitable location of the vehicle. In one or more arrangements, one or more of the environment sensors can be located toward the front end 101 of the vehicle 100. In one or more arrangements, one or more environment sensors can be located on a left side of the front end 101 of the vehicle 100. Alternatively or in addition, one or more environment sensors can be located on a right side of the front end 101 of the vehicle 100. Additionally or alternatively, one or more environment sensors can be located in any suitable location at or near the back end 102 of the vehicle 100. Various examples of the environment sensors will be described herein. However, it will be understood that the embodiments are not limited to the particular sensors described.

In one or more arrangements, the sensor system 125 can include one or more radar sensors 127. "Radar sensor" means any device, component and/or system that can detect, determine, assess, monitor, measure, quantify and/or sense something using at least in part radio signals. The one or more radar sensors 127 can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions (e.g. in the longitudinal direction, the lateral direction and/or other direction(s)), the speed of each detected object and/or the movement of each detected object.

In one or more arrangements, the sensor system 125 can include one or more lidar sensors 128. "Lidar sensor" means any device, component and/or system that can detect, determine, assess, monitor, measure, quantify and/or sense something using at least in part lasers. Such devices can include a laser source and/or laser scanner configured to emit a laser and a detector configured to detect reflections of the laser. The one or more lidar sensors 128 may be configured to operate in a coherent or an incoherent detection mode. The one or more lidar sensors 128 can be high resolution lidar sensors.

The one or more lidar sensors 128 can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions (e.g. in the longitudinal direction 104, the lateral direction 106 and/or other direction(s)), the elevation of each detected object, the speed of each detected object, and/or the movement of each detected object. Alternatively or in addition, data acquired by the one or more lidar sensors 128 can be processed to determine such things.

Alternatively or in addition to any of the sensors described above, the sensor system 125 can include other types of sensors. As an example, the sensor system 125 can include one or more ultrasonic sensors (not shown). The sensor system 125, the processor 110, and/or one or more other elements of the vehicle 100 can be configured to control movements of one or more of the sensors of the sensor system 125. It should be noted that any of the sensors described herein can be provided in any suitable location with respect to the vehicle 100. For instance, one or more sensors can be located within the vehicle 100, one or more sensors can be located on the exterior of the vehicle and/or one or more sensors can be located so as to be exposed to the exterior of the vehicle 100.

Alternatively or in addition to any of the sensors described above, the sensor system 125 can include other types of sensors. The sensor system 125, the processor 110, and/or one or more of the modules can be configured to control movements of one or more of the sensors of the sensor system 125. It should be noted that any of the sensors described herein can be provided in any suitable location with respect to the vehicle 100. For instance, one or more sensors can be located within the vehicle 100, one or more sensors can be located on the exterior of the vehicle and/or one or more sensors can be located so as to be exposed to the exterior of the vehicle 100.

The vehicle 100 can include a camera system 129. In one or more arrangements, the camera system 129 can be a part of the sensor system 125. The camera system 129 can include a one or more cameras. "Camera" is defined as any device, component, and/or system that can capture visual data. "Visual data" includes video and/or image information/data. The visual data can be in any suitable form. The one or more cameras can be high resolution cameras. The high resolution can refer to the pixel resolution, the spatial resolution, spectral resolution, temporal resolution and/or radiometric resolution. In one or more arrangements, the one or more cameras can be high dynamic range (HDR) cameras or infrared (IR) cameras. In one or more arrangements, the camera system 129 can capture visual data in high resolution in at least the longitudinal direction 104 of the vehicle 100. Alternatively or in addition, in one or more arrangements, the camera system 129 can capture visual data in medium and/or low resolution in the lateral direction 106 of the vehicle 100.

In one or more arrangements, one or more of the cameras can include a lens (not shown) and an image capture element (not shown). The image capture element can be any suitable type of image capturing device or system, including, for example, an area array sensor, a Charge Coupled Device (CCD) sensor, a Complementary Metal Oxide Semiconductor (CMOS) sensor, a linear array sensor, a CCD (monochrome). The image capture element may capture images in any suitable wavelength on the electromagnetic spectrum. The image capture element may capture color images and/or grayscale images. One or more of the cameras can be configured with zoom in and/or zoom out capabilities.

In one or more arrangements, one or more of the cameras can be oriented, positioned, configured, operable, and/or arranged to capture visual data from at least a portion of the external environment of the vehicle 100. The one or more cameras can be located in any suitable portion of the vehicle 100. For instance, one or more of the cameras can be located within the vehicle 100. One or more of the cameras can be located on the exterior of the vehicle 100. One or more of the cameras can be located on or exposed to the exterior of the vehicle 100.

The position of one or more of the cameras can be fixed such that its position does not change relative to the vehicle 100. One or more of the cameras can be movable so that its position can change to allow visual data from different portions of the external environment of the vehicle 100 to be captured. The movement of the cameras can be achieved in any suitable manner. For instance, the cameras can be rotatable about one or more axes, pivotable, slidable and/or extendable, just to name a few possibilities. In one or more arrangements, the cameras can have any suitable range of motion, including, for example, substantially spherical, substantially hemi-spherical, substantially circular and/or substantially linear. The one or more cameras and/or the movement of the one or more cameras can be controlled by the camera system 129, the sensor system 125, the processor 110 and/or any one or more of the modules described herein or other module.

The vehicle 100 can be configured to select one or more of the sensors and/or cameras to sense the driving environment based on the current given environmental conditions. For instance, in one or more arrangements, one or more lidar sensors 128 may be used to sense a driving environment at night. As another example, a high-dynamic range (HDR) camera of the camera system 129 may be used to sense the driving environment during the day. The detection of dynamic objects in the driving environment can be performed in any suitable manner. For instance, a frame by frame analysis of the driving environment can be performed using a machine vision system using any suitable technique.

The vehicle 100 can include an input system 130. An "input system" is defined as any device, component, system, element or arrangement or groups thereof that enable information/data to be entered into a machine. The input system 130 can receive an input from a vehicle occupant (e.g. a driver or a passenger). Any suitable input system 130 can be used, including, for example, a keypad, display, touch screen, multi-touch screen, button, joystick, mouse, trackball, microphone and/or combinations thereof.

The vehicle 100 can include an output system 131. An "output system" is defined as any device, component, system, element or arrangement or groups thereof that enable information/data to be presented to a vehicle occupant (e.g. a person, a vehicle occupant, etc.). The output system 131 can present information/data to a vehicle occupant. The output system 131 can include a display. Alternatively or in addition, the output system 131 may include a microphone, earphone and/or speaker. Some components of the vehicle 100 may serve as both a component of the input system 130 and a component of the output system 131.

In one or more arrangements, the vehicle 100 can include an object movement tracking module 132. The object movement tracking module 132 can be implemented as computer readable program code that, when executed by a processor, implements one or more of the various processes described herein, including, for example, to follow, observe, watch, and/or track the movement of an object over a plurality of sensor observations. "Sensor observation" means a moment of time or a period of time in which one or more sensors of a sensor system are used to acquire sensor data of at least a portion of a driving environment of a vehicle. The object movement tracking module 132 can be a component of the processor 110, or the object movement tracking module 132 can be executed on and/or distributed among other processing systems to which the processor 110 is operatively connected. The object movement tracking module 132 can include instructions (e.g., program logic) executable by the processor 110. Alternatively or in addition, the data store 115 may contain such instructions.

In one or more arrangements, the vehicle 100 can include an object movement classification module 133. The object movement classification module 133 can be implemented as computer readable program code that, when executed by a processor, implements one or more of the various processes described herein, including, for example, to follow, observe, watch, and/or track the movement of an object over a plurality of sensor observations. The object movement classification module 133 can be a component of the processor 110, or the object movement classification module 133 can be executed on and/or distributed among other processing systems to which the processor 110 is operatively connected. The object movement classification module 133 can include instructions (e.g., program logic) executable by the processor 110. Alternatively or in addition, the data store 115 may contain such instructions.

In one or more arrangements, the object movement classification module 133 can determine whether the movement of a dynamic object in the driving environment is ballistic or non-ballistic. "Ballistic" means that the object is moving in such a way that follows an expected path for the current conditions. For instance, for an object that falls off of a moving vehicle, ballistic means the path that the object will take at least due to gravity. Other forces, such as friction from aerodynamic drag, can be taken into account. "Ballistic" can also include objects that are moving in an easily predicted path. For instance, if an object is moving substantially consistently in a substantially straight line, then such object can be classified as moving in a ballistic manner.

"Non-ballistic" means that an object is moving in a way that deviates from an expected path for the current conditions. "Non-ballistic" can also include objects that are moving in erratic, irregular, or otherwise hard to predict paths. For instance, an object may move in one direction, stop briefly, and then move in a different direction. As an example, if an object has a large surface area compared to its weight or if an object is lighter than expected, then such an object is likely to be affected by air resistance and wind, thereby causing the path of the object to deviate from a ballistic or expected trajectory. Examples of such objects can be a bag or a cardboard box.

In one or more arrangements, the vehicle 100 can include an object size classification module 134. The object size classification module 134 can be implemented as computer readable program code that, when executed by a processor, implements one or more of the various processes described herein, including, for example, to classify the size of a dynamic object in a driving environment. The object size classification module 134 can be a component of the processor 110, or the object size classification module 134 can be executed on and/or distributed among other processing systems to which the processor 110 is operatively connected. The object size classification module 134 can include instructions (e.g., program logic) executable by the processor 110. Alternatively or in addition, the data store 115 may contain such instructions.

In some arrangements, the object size classification module 134 be configured to detect, determine, assess, measure, quantify and/or sense, directly or indirectly, a relative size of at least a portion of a detected object. The object size classification module 134 can be configured to classify the size of a detected dynamic object according to one or more defined classifications. In one or more arrangements, the classifications can include large and small. A "large" object can be any object that has one or more dimensions greater than a predetermined dimension or is otherwise presumed to be "large" based on one or more factors. A "small" object can be any object that has one or more dimensions less than a predetermined dimension or is otherwise presumed to be small based on one or more factors.

The relative size of a detected object can be determined in any suitable manner. For instance, a detected dimension of the object (e.g. length, width and/or height) can be compared to a predetermined dimension. The predetermined dimension can have any suitable value. In one or more arrangements, if the detected dimension is greater than the predetermined dimension, the object can be determined, classified and/or considered to be a large object. Such a comparison, determination, classification and/or consideration can be made by, for example, the processor 110 and/or the object size classification module 134. If the detected dimension is less than or equal to the predetermined dimension, the object can be determined, classified or considered to be a small object.

In one or more arrangements, the predetermined dimension can be a predetermined length. In such arrangements, the relative size of a detected object can be determined with respect to the predetermined length. For example, the length of an object can be detected. The detected length of the object can be compared to a predetermined length. The predetermined length can be any suitable length. If the detected length is greater than the predetermined length, the object can be determined, classified and/or considered to be a large object. If the detected length is less than or equal to the predetermined length, the object can be determined, classified and/or considered to be a small object.

Alternatively or in addition, the sensor system 125, the processor 110 and/or the object size classification module 134 can be configured to detect, determine, assess, measure, quantify and/or sense, directly or indirectly, the size of at least a portion of a dynamic object. As an example, an object can have an associated diameter and/or radius. The radius or diameter can be determined by a direct measurement of the diameter or radius of the object. In some arrangements, the detected diameter or radius can be compared to a predetermined diameter or radius. The predetermined diameter or radius can be any suitable value. If the detected diameter or radius is greater than the predetermined diameter or radius, the object can be determined to be a large object. If the detected diameter or radius is less than or equal to the predetermined diameter or radius, the object can be determined, classified and/or considered to be a small object.

In one or more arrangements, the vehicle 100 can include a dynamic object maneuvering module 135. The dynamic object maneuvering module 135 can be implemented as computer readable program code that, when executed by a processor, implements one or more of the various processes described herein, including, for example, to determine one or more driving maneuvers based at least in part on a dynamic object detected in the driving environment. The dynamic object maneuvering module 135 can be a component of the processor 110, or the dynamic object maneuvering module 135 can be executed on and/or distributed among other processing systems to which the processor 110 is operatively connected. The dynamic object maneuvering module 135 can include instructions (e.g., program logic) executable by the processor 110. Alternatively or in addition, the data store 115 may contain such instructions.

In some arrangements, the dynamic object maneuvering module 135 be configured to determine one or more driving maneuvers to implement relative to a detected dynamic object in the driving environment. In one or more arrangements, such a determination can be based at least in part on the classified movement of the dynamic object. Alternatively or in addition, in one or more arrangements, such a determination can be based at least in part on the classified size of the dynamic object.

In one or more arrangements, if the movement of the dynamic object is classified as being ballistic and the size of the dynamic object is classified as being large, the determined driving maneuver can include one or more aggressive evasive maneuvers. "Aggressive evasive maneuver" means a driving maneuver that includes a rapid change in vehicle movement to avoid collision with a dynamic object.

Examples of aggressive evasive actions can include quickly changing travel lanes, driving between two travel lanes, driving on a shoulder of a road, a sharp reduction in speed, a sharp increase in speed, hard braking, a sharp deceleration, and/or sharp acceleration, just to name a few possibilities. An aggressive evasive action can include maneuvers that may safely violate a traffic rule. Examples of violating a traffic rule include driving at least partially on a shoulder of a road, exceeding the speed limit, driving at least partially on an emergency lane, passing in a non-passing travel lane, changing lanes without signaling, and/or driving at least partially off the road, just to name a few possibilities. "Safely violate a traffic rule" means that the operation of the vehicle according to the altered travel route would violate a traffic rule, but it would not result in damage, injury or endangerment of the vehicle 100, its occupants, or persons or property located in the external environment (e.g. by collision). If at least a portion of an altered travel route would violate a traffic rule but would also result in an object in the external environment being struck by the vehicle, then the altered travel route would not be considered to safely violate a traffic rule.

If the movement of the dynamic object is classified as being ballistic and the size of the dynamic object is classified as being small, the determined driving maneuver includes one or more conservative evasive maneuvers. "Conservative evasive maneuvers" means a driving maneuver that gradually attempts to avoid collision with a dynamic object while maintaining safe operation of the vehicle. Examples of conservative evasive maneuvers can include changing travel lanes, moving in a lateral direction within a current travel lane, a minimal reduction in speed, a minimal increase in speed, a gradual deceleration, and/or a gradual acceleration, just to name a few possibilities. Conservative evasive maneuvers avoid drastic changes in the operation of the vehicle 100. Conservative evasive maneuvers generally do not violate traffic rules.

If the movement of the dynamic object is classified as being non-ballistic and the size of the dynamic object is classified as being large, the driving maneuver includes one or more conservative evasive maneuvers, as described above. If the movement of the dynamic object is classified as being non-ballistic and the size of the dynamic object is classified as being small, the dynamic object maneuvering module 135 be configured to ignore the dynamic object in determining a driving maneuver for the autonomous vehicle.

In one or more arrangements, the vehicle 100 can include a collision determination module 136. The collision determination module 136 can be implemented as computer readable program code that, when executed by a processor, implements one or more of the various processes described herein, including, for example, to determine or predict whether a dynamic object detected in the driving environment will collide with the vehicle 100. The collision determination module 136 can be a component of the processor 110, or the collision determination module 136 can be executed on and/or distributed among other processing systems to which the processor 110 is operatively connected. The collision determination module 136 can include instructions (e.g., program logic) executable by the processor 110. Alternatively or in addition, the data store 115 may contain such instructions.

The collision determination module 136 can be configured to determine or predict whether a dynamic object detected in the driving environment will collide with the vehicle in any suitable manner. Various factors can be used in the determination, including, for example, one or more of the following: speed of the vehicle 100, travel route of the vehicle 100, the current location of the vehicle, the current location of the dynamic object, the location of the dynamic object relative to the vehicle 100, past movement(s) of the dynamic object, predicted future movements of the dynamic object, speed of the dynamic object.

The collision determination module 136 can be configured to determine or predict whether a collision between the dynamic object and the autonomous vehicle is avoidable or unavoidable. Such a determination may consider one or more factors, including, for example, one or more of the following: the location of other objects in the driving environment, road conditions, road markings, traffic rules, etc.

In one or more arrangements, the vehicle 100 can include a collision mitigation module 137. The collision mitigation module 137 can be implemented as computer readable program code that, when executed by a processor, implements one or more of the various processes described herein, including, for example, to determine or predict whether a dynamic object detected in the driving environment will collide with the vehicle 100. The collision mitigation module 137 can be a component of the processor 110, or the collision mitigation module 137 can be executed on and/or distributed among other processing systems to which the processor 110 is operatively connected. The collision mitigation module 137 can include instructions (e.g., program logic) executable by the processor 110. Alternatively or in addition, the data store 115 may contain such instructions.

Responsive to determining that a collision between the dynamic object and the autonomous vehicle is unavoidable, the collision mitigation module 137 can be configured to determining a collision mitigating maneuver for the vehicle 100. A "collision mitigating maneuver" is any maneuver that can protect one or more occupants of a vehicle. In one or more arrangements, determining the collision mitigating maneuver for the vehicle 100 can be based at least partially on the location of at least one occupant within the vehicle 100. The location of the vehicle occupants can be determined in any suitable manner, such as by using one or more pressure sensors, weight sensors, heat sensors, and/or other suitable sensor, just to name a few possibilities. In one or more arrangements, determining the collision mitigating maneuver for the vehicle 100 can be based at least partially on a characteristic of a particular area of the vehicle 100. For instance, the driving maneuver can include positioning the vehicle 100 so that the object can collide with the vehicle 100 in a more impact resistant area of the vehicle 100.

In one or more arrangements, the vehicle 100 can include an object detection module 138. The object detection module 138 can be implemented as computer readable program code that, when executed by a processor, implement one or more of the various processes described herein, including, for example, to detect a dynamic object detected in the driving environment and to identify the dynamic object if such identification is feasible. The object detection module 138 can be a component of the processor 110, or the object detection module 138 can be executed on and/or distributed among other processing systems to which the processor 110 is operatively connected. The object detection module 138 can include instructions (e.g., program logic) executable by the processor 110. Alternatively or in addition, the data store 115 may contain such instructions.

The object detection module 138 can detect and attempt to identify a dynamic object in any suitable manner. The detection of a dynamic object can be performed in any suitable manner. For instance, the detection can be performed using data acquired by the sensor system 125 (e.g., one or more radar sensors 127, one or more lidar sensors 128, and/or other sensor) and/or the camera system 129. Any suitable object detection technique, now known or later developed, can be used.

If a dynamic object is detected, the object detection module 138 can, in one or more arrangements, attempt to identify the dynamic object. However, it will be appreciated that, in some instances, the identification of the detected object may not be possible for one or more of a variety of reasons. For example, in some instances, the identification of the detected object may not be possible due to unfavorable environmental conditions. Non-limiting examples of unfavorable environmental conditions can include low light conditions for the camera system 129, heavy rain/snow for the lidar sensor(s) 128, and/or partial occlusion of the detected dynamic object, just to name a few possibilities. In some arrangements, the detected object may not be identifiable due to prior knowledge limitations, a lack of information or data about such an object, or for some other reason.

The object detection module 138 can attempt to identify the dynamic object in any suitable manner. For instance, in one or more arrangements, the object detection module 138 can include and/or have access to an object image database (not shown). The objects image database can include one or more images of a plurality of different objects (e.g., non-vehicular objects which might be present occasionally on the roads such as cardboard boxes, etc.). The images can be any object-relevant data obtained by a lidar sensor, a radar sensor, and/or a camera sensor. The images may be of one or more portions of the exterior of at least a portion of a plurality of different objects. For instance, the images can be of at least a portion of an object. The images can be provided in any suitable format. The object image database can be located on-board the vehicle 100, such as in the data store 115, or it can be located in a source external to the vehicle 100 (e.g. in a cloud-based data store).

As an example, the object detection module 138 can also include any suitable object recognition software. The object recognition software can analyze an image captured by the sensor system 125 (e.g., radar sensor(s) 127, lidar sensor(s) 128, and/or other sensors) and/or the camera system 129. The object recognition software can query the object image database for possible matches. For instance, images captured by the camera system 129 and/or the sensor system 125 can be compared to images in the object image database for possible matches. Alternatively or in addition, measurements or other aspects of an image captured by the camera system 129 and/or the sensor system 125 can be compared to measurements or other aspects of any images in the object image database. The object detection module 138 can identify the detected object as a particular type of object if there is a match between the captured image and an image in the object database. "Match" or "matches" means that an image or other information collected by the sensor system and one or more of the images in the object image database are substantially identical. For instance, an image or other information collected by the sensor system and one or more of the images in the object image database can match within a predetermined probability (e.g., at least about 85%, at least about 90%, at least about 95% or greater) or confidence level.

In one or more arrangements, one or more of the modules 120, 132, 133, 134, 135, 136, 137, 138 described herein can include artificial or computational intelligence elements, e.g., neural network, fuzzy logic or other machine learning algorithms. Further, in one or more arrangements, one or more of the modules 120, 132, 133, 134, 135, 136, 137, 138 can be distributed among a plurality of the modules described herein. In one or more arrangements, two or more of the modules 120, 132, 133, 134, 135, 136, 137, 138 described herein can be combined into a single module.

The vehicle 100 can include one or more vehicle systems 145. Various examples of the one or more vehicle systems 145 are shown in FIG. 1. However, the vehicle 100 can include more, fewer or different systems. It should be appreciated that although particular vehicle systems are separately defined, each or any of the systems or portions thereof may be otherwise combined or segregated via hardware and/or software within the vehicle 100.

The vehicle 100 can include a propulsion system 150. The propulsion system 150 can include one or more mechanisms, devices, elements, components, systems, and/or combinations thereof, now known or later developed, configured to provide powered motion for the vehicle 100. The propulsion system 150 can include an engine and an energy source.

The engine can be any suitable type of engine or motor, now known or later developed. For instance, the engine can be an internal combustion engine, an electric motor, a steam engine, and/or a Stirling engine, just to name a few possibilities. In some embodiments, the propulsion system could include a plurality of engine types. For instance, a gas-electric hybrid vehicle can include a gasoline engine and an electric motor.

The energy source can be any suitable source of energy that can be used to at least partially power the engine. The engine can be configured to convert the energy source into mechanical energy. Examples of energy sources include gasoline, diesel, propane, hydrogen, other compressed gas-based fuels, ethanol, solar panels, batteries, and/or other sources of electrical power. Alternatively or in addition, the energy source can include fuel tanks, batteries, capacitors, and/or flywheels. In some embodiments, the energy source can be used to provide energy for other systems of the vehicle 100.

The vehicle 100 can include wheels, tires and/or tracks. Any suitable type of wheels, tires and/or tracks can be used. In one or more arrangements, the wheels, tires and/or tracks of the vehicle 100 can be configured to rotate differentially with respect to other wheels, tires and/or tracks of the vehicle 100. The wheels, tires and/or tracks can be made of any suitable material.

The vehicle 100 can include a braking system 155. The braking system 155 can include one or more mechanisms, devices, elements, components, systems, and/or combinations thereof, now known or later developed, configured to decelerate the vehicle 100. As an example, the braking system 155 can use friction to slow the wheels/tires. The braking system 155 can convert the kinetic energy of the wheels/tires to electric current.

Further, the vehicle 100 can include a steering system 160. The steering system 160 can include one or more mechanisms, devices, elements, components, systems, and/or combinations thereof, now known or later developed, configured to adjust the heading of the vehicle 100.

The vehicle 100 can include a throttle system 165. The throttle system 165 can include one or more mechanisms, devices, elements, components, systems, and/or combinations thereof, now known or later developed, configured to control the operating speed of an engine/motor of the vehicle 100 and, in turn, the speed of the vehicle 100.

The vehicle 100 can include a transmission system 170. The transmission system 170 can include one or more mechanisms, devices, elements, components, systems, and/or combinations thereof, now known or later developed, configured to transmit mechanical power from the engine/motor of the vehicle 100 to the wheels/tires. For instance, the transmission system 170 can include a gearbox, clutch, differential, drive shafts, and/or other elements. In arrangements where the transmission system 170 includes drive shafts, the drive shafts can include one or more axles that are configured to be coupled to the wheels/tires.

The vehicle 100 can include a signaling system 175. The signaling system 175 can include one or more mechanisms, devices, elements, components, systems, and/or combinations thereof, now known or later developed, configured to provide illumination for the driver of the vehicle 100 and/or to provide information with respect to one or more aspects of the vehicle 100. For instance, the signaling system 175 can provide information regarding the vehicle's presence, position, size, direction of travel, and/or the driver's intentions regarding direction and speed of travel. For instance, the signaling system 175 can include headlights, taillights, brake lights, hazard lights and turn signal lights.

The vehicle 100 can include a navigation system 180. The navigation system 180 can include one or more mechanisms, devices, elements, components, systems, applications and/or combinations thereof, now known or later developed, configured to determine the geographic location of the vehicle 100 and/or to determine a travel route for the vehicle 100.

The navigation system 180 can include one or more mapping applications to determine a travel route for the vehicle 100. For instance, a driver or passenger may input an origin and a destination. The mapping application can determine one or more suitable travel routes between the origin and the destination. A travel route may be selected based on one or more parameters (e.g. shortest travel distance, shortest amount of travel time, etc.). In some arrangements, the navigation system 180 can be configured to update the travel route dynamically while the vehicle 100 is in operation.

The navigation system 180 can include a global positioning system, a local positioning system or a geolocation system. The navigation system 180 can be implemented with any one of a number of satellite positioning systems, such as the United States Global Positioning System (GPS), the Russian Glonass system, the European Galileo system, the Chinese Beidou system, or any system that uses satellites from a combination of satellite systems, or any satellite system developed in the future, including the planned Chinese COMPASS system and the Indian Regional Navigational Satellite System. Further, the navigation system 180 can use Transmission Control Protocol (TCP) and/or a Geographic information system (GIS) and location services.

The navigation system 180 may include a transceiver configured to estimate a position of the vehicle 100 with respect to the Earth. For example, navigation system 180 can include a GPS transceiver to determine the vehicle's latitude, longitude and/or altitude. The navigation system 180 can use other systems (e.g. laser-based localization systems, inertial-aided GPS, and/or camera-based localization) to determine the location of the vehicle 100.

Alternatively or in addition, the navigation system 180 can be based on access point geolocation services, such as using the W3C Geolocation Application Programming Interface (API). With such a system, the location of the vehicle 100 can be determined through the consulting of location information servers, including, for example, Internet protocol (IP) address, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs. Thus, it will be understood that the specific manner in which the geographic position of the vehicle 100 is determined will depend on the manner of operation of the particular location tracking system used.

The processor 110 and/or the autonomous driving module 120 can be operatively connected to communicate with the various vehicle systems 145 and/or individual components thereof. For example, the processor 110 and/or the autonomous driving module 120 can be in communication to send and/or receive information from the various vehicle systems 145 to control the movement, speed, maneuvering, heading, direction, etc. of vehicle 100. The processor 110 and/or the autonomous driving module 120 may control some or all of these vehicle systems 145 and, thus, may be partially or fully autonomous.

The processor 110 and/or the autonomous driving module 120 may be configured to control the navigation and/or maneuvering of the vehicle 100 by controlling one or more of the vehicle systems 145 and/or components thereof. For instance, when operating in an autonomous mode, the processor 110 and/or the autonomous driving module 120 can control the direction and/or speed of the vehicle 100. The processor 110 and/or the autonomous driving module 120 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 140. The actuators 140 can be any element or combination of elements configured to modify, adjust and/or alter one or more of the vehicle systems 145 or components thereof to responsive to receiving signals or other inputs from the processor 110 and/or the autonomous driving module 120. Any suitable actuator can be used. For instance, the one or more actuators 140 can include motors, pneumatic actuators, hydraulic pistons, relays, solenoids, and/or piezoelectric actuators, just to name a few possibilities.

According to arrangements described herein, the vehicle 100 can be configured for operating an autonomous vehicle in environments in which an unexpected dynamic object appears. Examples of such objects include objects falling off of another vehicle or an animal (including a person) darting into traffic. According to arrangements herein, the vehicle 100 (or one or more elements thereof) can be configured to detect such dynamic objects. Further, the vehicle 100 (or one or more elements thereof) can be configured to, responsive to determining that the detected dynamic object is on a collision course with the autonomous vehicle, determining a driving maneuver for the vehicle 100. The driving maneuver can be based at least in part on the movement of the dynamic object, the classification of the movement of the dynamic object, and/or the size of the dynamic object.

Figure 2:
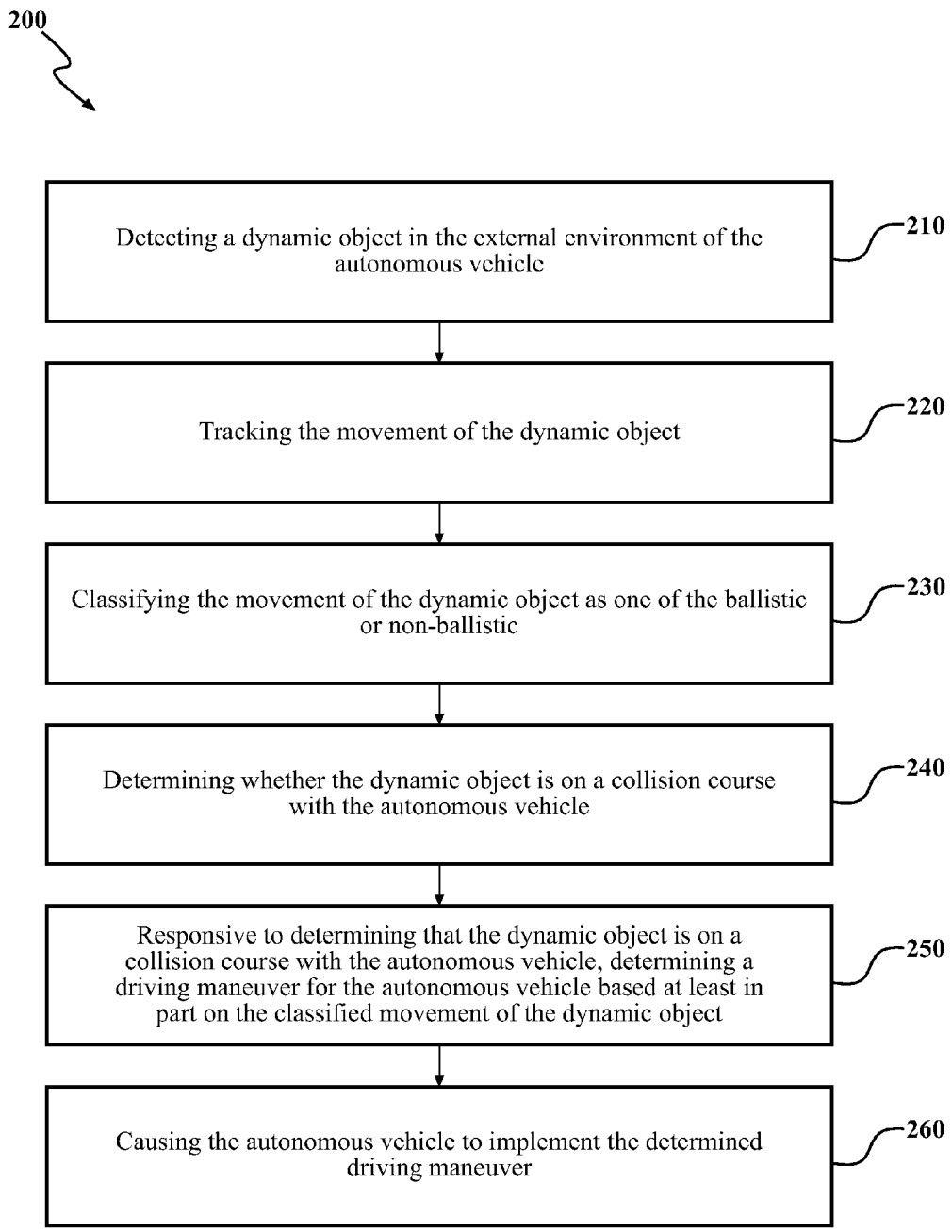
FIG. 2 is an example of a method of operating an autonomous vehicle in an environment with an unexpected dynamic object.

Now that the various potential systems, devices, elements and/or components of the vehicle 100 have been described, various methods for operating the vehicle will now be described. Referring now to FIG. 2, an example of another method of operating an autonomous vehicle relative to unexpected dynamic objects in an external environment is shown. Various possible steps of method 200 will now be described. The method 200 illustrated in FIG. 2 may be applicable to the embodiments described above in relation to FIG. 1, but it is understood that the method 200 can be carried out with other suitable systems and arrangements. Moreover, the method 200 may include other steps that are not shown here, and in fact, the method 200 is not limited to including every step shown in FIG. 2. The steps that are illustrated here as part of the method 200 are not limited to this particular chronological order. Indeed, some of the steps may be performed in a different order than what is shown and/or at least some of the steps shown can occur simultaneously.

At block 210, a dynamic object can be detected in the external environment of the vehicle. The dynamic object can have an associated movement. At least a portion of an external environment of the autonomous vehicle can be sensed to detect such dynamic objects. The sensing of the external environment to detect the presence of a dynamic object therein can be performed by any suitable element or combination of elements of the vehicle 100. In one or more arrangements, the sensing of the external environment can be performed, at least in part, by the sensor system 125 (one or more sensors or components thereof), the camera system 129 (or portion thereof) and/or the processor 110. The method 200 can continue to block 220.

At block 220, the movement of the dynamic object can be tracked. The tracking can occur over a plurality of sensor detection moments or frames. The tracking of the dynamic object can be performed by any suitable element or combination of elements of the vehicle 100. In one or more arrangements, the tracking of the dynamic object can be performed, at least in part, by the object movement tracking module 132 and/or the processor 110. The method 200 can continue to block 230.

At block 230, the movement of the dynamic object can be classified. More particularly, the movement of the dynamic object can be classified as one of ballistic or non-ballistic. The classifying of the movement of the dynamic object can be performed by any suitable element or combination of elements of the vehicle 100. In one or more arrangements, the classifying of the movement of the dynamic object can be performed, at least in part, by the object movement classification module 133 and/or the processor 110. The method 200 can continue to block 240.

At block 240, it can be determined whether the dynamic object is on a collision course with the vehicle 100. Such a determination can be performed by any suitable element or combination of elements of the vehicle 100. For instance, in one or more arrangements, the determining can be performed by the processor 110 and/or the collision determination module 136. The method can continue to block 250.

At block 250, responsive to determining that the dynamic object is on a collision course with the vehicle 100, a driving maneuver for the vehicle 100 can be determined. The driving maneuver can be determined based at least in part on the movement of the dynamic object. Such a determination can be performed by any suitable element or combination of elements of the vehicle 100. For instance, in one or more arrangements, the determining can be performed by the processor 110, the autonomous driving module 120 and/or the dynamic object maneuvering module 135. The method can continue to block 260.

At block 260, the driving maneuver of the vehicle 100 can be caused to be implemented. In one or more arrangements, the processor 110 and/or the autonomous driving module 120 can cause the vehicle 100 to implement the driving maneuver. The processor 110 and/or the autonomous driving module 120 can be operatively connected to one or more of the vehicle systems 145 to cause the future planned driving maneuver to be implemented. In one or more arrangements, the processor 110 and/or the autonomous driving module 120 can be configured to control the one or more actuators 140, which can control one or more of the vehicle systems 145 or portions thereof to implement the determined driving maneuver.

It should be noted that causing the driving maneuver to be implemented can be performed automatically. In one or more arrangements, a vehicle occupant (e.g. a driver and/or other passenger) can be prompted to provide permission to implement the driving maneuver. The vehicle occupant can be prompted in any suitable manner. For instance, a prompt can be presented on a display within the vehicle 100. Alternatively or in addition, the prompt can be audibly output to the vehicle occupant over one or more audial channels. Other forms of prompting can be used as an alternative or in addition to the above-described forms of prompting. Responsive to receiving an input corresponding to a vehicle occupant's approval to implement the driving maneuver, the vehicle 100 can be caused to implement the driving maneuver. In some instances, the driving maneuver can be implemented only if it is determined to be safe to do so. To that end, the vehicle 100 can consider the current driving environment, the road, adjacent lanes, other objects, etc.

When the vehicle 100 is caused to implement the driving maneuver, the method 200 can end. Alternatively, the method 200 can return to block 210. As a further alternative, the method 200 can include additional blocks (not shown). For instance, the method 200 can include classifying a size of the dynamic object. In one or more arrangements, the size of the object can be classified as small or large. However, alternative and/or additional classifications are possible. The driving maneuver can be determined based at least in part on the classification of the size of the dynamic object. Such a determination can be performed by any suitable element or combination of elements of the vehicle 100. For instance, in one or more arrangements, the determining can be performed by the processor 110, the autonomous driving module 120 and/or the object size classification module 134.

In some arrangements, the method 200 can include determining whether a collision between the dynamic object and the vehicle 100 is avoidable or unavoidable. Responsive to determining that a collision between the dynamic object and the autonomous vehicle is unavoidable, a collision mitigating maneuver for the vehicle 100 can be determined. Such a determination can be performed by any suitable element or combination of elements of the vehicle 100. For instance, in one or more arrangements, the determining can be performed by the processor 110, the autonomous driving module 120 and/or the collision determination module 136. The determination can be made in any suitable manner. For instance, in one or more arrangements, the collision mitigating maneuver for the vehicle 100 can be based at least partially on the location of at least one occupant within the vehicle 100.

Various non-limiting examples of the operation of the vehicle 100 will now be described. A non-limiting example of the operation of the vehicle in accordance with a lane changing method will now be described in relation to FIGS. 3A-3B. For purposes of this example, the vehicle 100 can be traveling in a driving environment 300. The vehicle 100 can be traveling on a road 305. "Road" means a thoroughfare, route, path or way between two places and upon which a vehicle can travel. The road 305 may be paved or otherwise improved to facilitate travel by a vehicle thereon. In some instances, the road 305 may be unpaved or undeveloped. The road 305 may be a public road or a private road. The road 305 can include or be a part of one or more bridges, tunnels, supporting structures, junctions, crossings, interchanges, and toll roads.

Figure 3A:
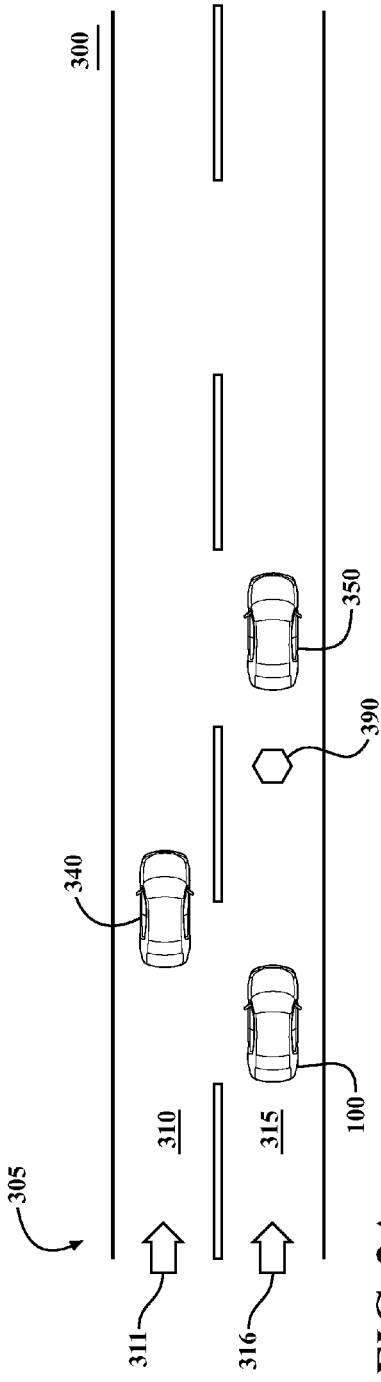
FIG. 3A is an example of an environment in which an autonomous vehicle encounters an unexpected dynamic object.
Figure 3B:
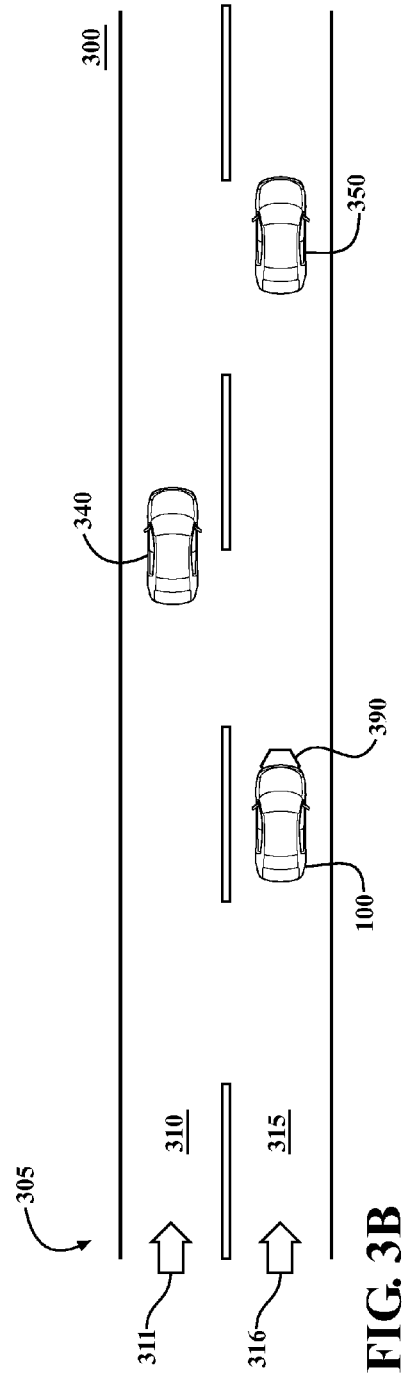
FIG. 3B is an example of the environment of FIG. 3A, showing the autonomous vehicle implementing a driving maneuver based at least in part on the unexpected dynamic object.

For this example, the road 305 can include a first travel lane 310 and a second travel lane 315. A "travel lane" is a portion of a road that is designated for use by a single line of vehicles and/or a portion of a road that is being used by a single line of vehicles. In some instances, the first travel lane 310 and the second travel lane 315 can be designated by markings on the road 305 or in any other suitable manner. In some instances, one or more of the travel lanes may not be marked. It should be noted that the first and second travel lanes 310, 315 can be substantially adjacent to each other, as is shown in FIGS. 3A-3B. However, in some instances, the first and second travel lanes 310, 315 can be spaced from each other. The first and second travel lanes 310, 315 can be substantially parallel to each other along at least a portion of their lengths.

For purposes of this example, vehicles can move in or can be designated to move in a first direction 311 in the first travel lane 310. Vehicles can move in or can be designated to move in a second direction 316 in the second travel lane 315. The first direction 311 can be the same as the second direction 316, as is shown in FIG. 3A. However, it will be understood that in other arrangements, the first direction 311 and the second direction 316 can be opposite to each other.

While FIGS. 3A-3B show an example in which the road 305 includes two travel lanes (the first and second travel lanes 310, 315), it will be understood that arrangements described herein are not limited to roads having two travel lanes. Indeed, arrangements described herein can be used in connection with roads having any number of travel lanes. Further, it should be noted that the vehicles in such other travel lanes can travel in or can be designated to travel in the same direction as the first or second direction 311, 316. Alternatively, the vehicles in such other travel lanes can travel in or can be designated to travel in a different direction than the first or second direction 311, 316.

In FIGS. 3A-3B, the current travel lane of the vehicle 100 can be the second travel lane 315. "Current travel lane" means a travel lane that a vehicle is traveling on at the present time. There can be another vehicle 350 located in the second travel lane 315. The other vehicle 350 can be located forward of the vehicle 100 in the direction 316. There can also be another vehicle 340 located in the first travel lane 310.

An object may separate from the other vehicle 350. The object can be any type of object. For purposes of this example, the object is a small paper bag 390 that has escaped through an open window of the vehicle 350. The paper bag 390 can blow in the wind. In this example, the paper bag 390 will move within the second travel lane 315.

The vehicle 100 can detect the environment 300, such as by using the sensor system 125 and/or the camera system 129. The vehicle 100 can detect the presence of the paper bag 390. The movement of the paper bag 390 can be tracked. The movement of the paper bag 390 can be classified. In arrangements in which the movement of a dynamic object is classified as being ballistic or non-ballistic, the movement of the paper bag 390 will be non-ballistic as it moves in multiple directions under the influence of the wind and/or other factors. Also, it can be determined that the paper bag 390 is a small object.

Since the paper bag 390 remains within the second travel lane 315, the vehicle 100 can determine that the paper bag 390 is on a collision course with the vehicle 100. Responsive to this determination, a driving maneuver for the vehicle 100 based at least in part on the movement of the dynamic object can be determined. In this example, the movement of the dynamic object can be classified as being non-ballistic and the size of the dynamic object can be classified as being small. As a result, the vehicle 100 can determine that the risk of adverse consequences is small. Thus, the vehicle 100 can ignore the dynamic object in determining a driving maneuver. For instance, the vehicle 100 can determine the driving action to be maintaining its current travel path in the second travel lane 315. FIG. 3B shows the vehicle 100 moving forward in the second travel lane 315 and impinging on the paper bag 390.

It will be appreciated that arrangements described herein can provide numerous benefits, including one or more of the benefits mentioned herein. For example, arrangements described herein can improve the performance of an autonomous vehicle when encountering unexpected dynamic objects in a driving environments. Further, arrangements described herein can potentially improve the safe operation of the vehicle.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of operating an autonomous vehicle relative to unexpected dynamic objects in an external environment, the method comprising:
    detecting a dynamic object in the external environment of the autonomous vehicle, the dynamic object having an associated movement;
    tracking the movement of the dynamic object;
    classifying the movement of the dynamic object as one of ballistic or non-ballistic;
    classifying a size of the dynamic object;
    determining whether the dynamic object is on a collision course with the autonomous vehicle;
    responsive to determining that the dynamic object is on a collision course with the autonomous vehicle, determining a driving maneuver for the autonomous vehicle based at least in part on the classified movement of the dynamic object and the classified size of the dynamic object; and
    causing the autonomous vehicle to implement the determined driving maneuver.

2. The method of claim 1, wherein the size of the dynamic object is classified as one of small or large.

3. The method of claim 2, wherein, if the movement of the dynamic object is classified as being ballistic and the size of the dynamic object is classified as being large, the determined driving maneuver includes one or more aggressive evasive maneuvers.

4. The method of claim 2, wherein, if the movement of the dynamic object is classified as being ballistic and the size of the dynamic object is classified as being small, the determined driving maneuver includes one or more evasive maneuvers.

5. The method of claim 2, wherein, if the movement of the dynamic object is classified as being non-ballistic and the size of the dynamic object is classified as being large, the driving maneuver includes one or more evasive maneuvers.

6. The method of claim 2, wherein, if the movement of the dynamic object is classified as being non-ballistic and the size of the dynamic object is classified as being small, further including:
    ignoring the dynamic object in determining a driving maneuver for the autonomous vehicle.

7. The method of claim 1, further including:
    determining whether a collision between the dynamic object and the autonomous vehicle is avoidable or unavoidable; and
    responsive to determining that a collision between the dynamic object and the autonomous vehicle is unavoidable, determining a collision mitigating maneuver for the autonomous vehicle.

8. The method of claim 7, wherein determining the collision mitigating maneuver for the autonomous vehicle is based at least partially on the location of at least one occupant within the autonomous vehicle.

9. The method of claim 1, wherein causing the autonomous vehicle to implement the determined driving maneuver includes automatically causing the autonomous vehicle to implement the determined driving maneuver.

10. The method of claim 1, wherein causing the autonomous vehicle to implement the determined driving maneuver includes causing the autonomous vehicle to implement the determined driving maneuver responsive to receiving a vehicle occupant input.

11. A system for operating an autonomous vehicle relative to unexpected dynamic objects in an external environment, the system comprising:
    a sensor system configured to detect a dynamic object in the external environment of the autonomous vehicle, the dynamic object having an associated movement;
    a processor operatively connected to the sensor system, the processor being programmed to initiate executable operations comprising:
        tracking the movement of the dynamic object;
        classifying the movement of the dynamic object as one of ballistic or non-ballistic;
        classifying a size of the dynamic object;
        determining whether the dynamic object is on a collision course with the autonomous vehicle;

responsive to determining that the dynamic object is on a collision course with the autonomous vehicle, determining a driving maneuver for the autonomous vehicle based at least in part on the classified movement of the dynamic object and the classified size of the dynamic object; and causing the autonomous vehicle to implement the determined driving maneuver.

12. The system of claim 11, wherein the size of the dynamic object is classified as one of small or large.

13. The system of claim 12, wherein, if the movement of the dynamic object is classified as being ballistic and the size of the dynamic object is classified as being large, the determined driving maneuver includes one or more aggressive evasive maneuvers.

14. The system of claim 12, wherein, if the movement of the dynamic object is classified as being ballistic and the size of the dynamic object is classified as being small, the determined driving maneuver includes one or more evasive maneuvers.

15. The system of claim 12, wherein, if the movement of the dynamic object is classified as being non-ballistic and the size of the dynamic object is classified as being large, the driving maneuver includes one or more evasive maneuvers.

16. The system of claim 12, wherein, if the movement of the dynamic object is classified as being non-ballistic and the size of the dynamic object is classified as being small, further including:

ignoring the dynamic object in determining a driving maneuver for the autonomous vehicle.

17. The system of claim 11, further including:

determining whether a collision between the dynamic object and the autonomous vehicle is avoidable or unavoidable; and responsive to determining that a collision between the dynamic object and the autonomous vehicle is unavoidable, determining a collision mitigating maneuver for the autonomous vehicle.

18. The system of claim 17, wherein determining the collision mitigating maneuver for the autonomous vehicle is based at least partially on the location of at least one occupant within the autonomous vehicle.

19. The system of claim 11, wherein causing the autonomous vehicle to implement the determined driving maneuver includes automatically causing the autonomous vehicle to implement the determined driving maneuver.

20. A computer program product for operating an autonomous vehicle relative to unexpected dynamic objects in an external environment, the computer program product comprising a computer readable storage medium having program code embodied therein, the program code executable by a processor to perform a method comprising:

detecting a dynamic object in the external environment of the autonomous vehicle, the dynamic object having an associated movement;

tracking the movement of the dynamic object;

classifying the movement of the dynamic object as one of ballistic or non-ballistic;

classifying a size of the dynamic object;

determining whether the dynamic object is on a collision course with the autonomous vehicle;

responsive to determining that the dynamic object is on a collision course with the autonomous vehicle, determining a driving maneuver for the autonomous vehicle based at least in part on the classified movement of the dynamic object and the classified size of the dynamic object; and causing the autonomous vehicle to implement the determined driving maneuver.

* * * * *